G. C. Timpe. Elevators.
No. 118300
PATENTED AUG 22 1871
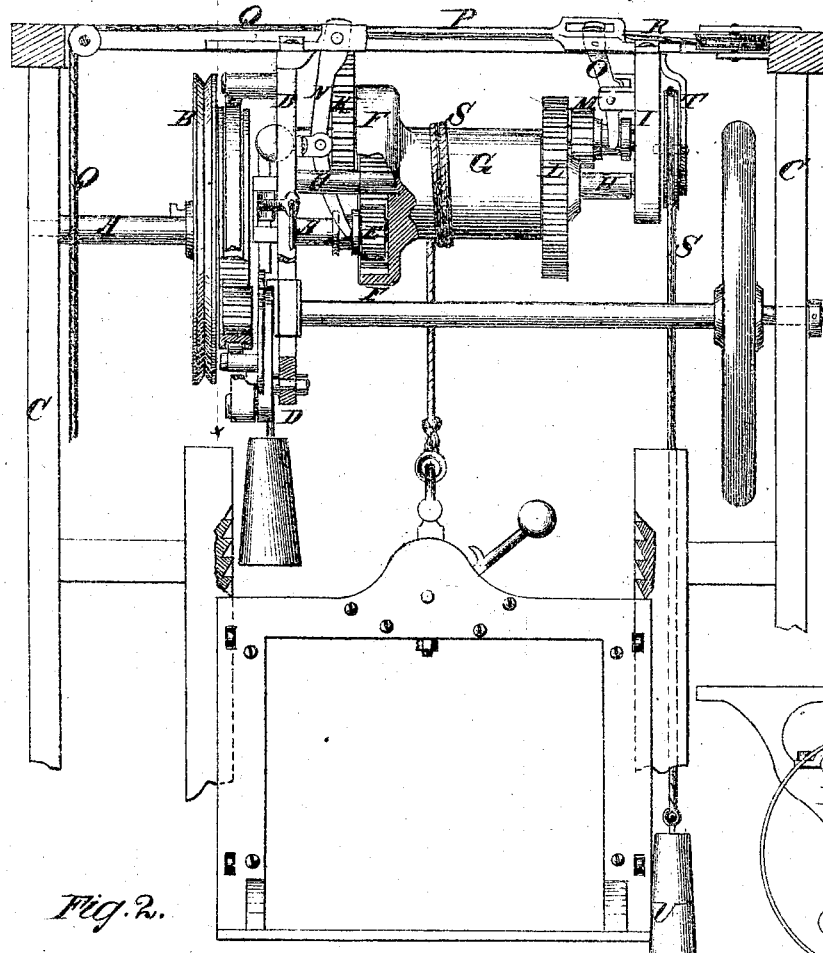
Fig. 1.
Fig. 3.
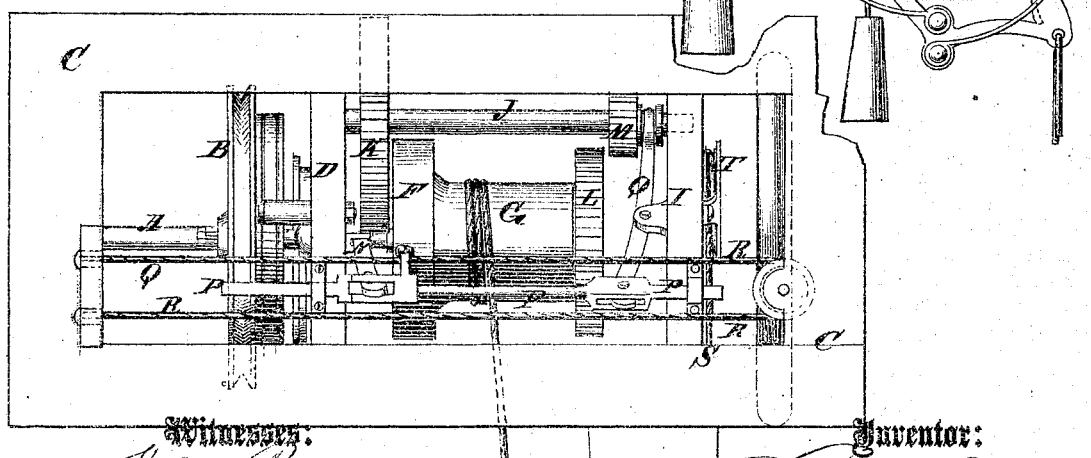
Fig. 2.
Witnesses:
John Becker
Gustave Dieterich
Inventor:
G. C. Timpe
per Munn & Co.
Attorneys.

UNITED STATES PATENT OFFICE.

GUSTAVUS C. TIMPE, OF NEW ORLEANS, LOUISIANA.

IMPROVEMENT IN ELEVATORS.

Specification forming part of Letters Patent No. 118,300, dated August 22, 1871.

*To all whom it may concern:*

Be it known that I, GUSTAVUS C. TIMPE, of New Orleans, in the parish of Orleans and State of Louisiana, have invented a new and useful Improvement in Elevators; and I do hereby declare that the following is a full, clear, and exact description thereof, which will enable others skilled in the art to make and use the same, reference being had to the accompanying drawing forming part of this specification, in which—

Figure 1 is a side view of my improved elevator, parts being broken away to show the construction. Fig. 2 is a top view of the same. Fig. 3 is a detail sectional view of the same taken through the line $x\ x$, Fig. 1.

Similar letters of reference indicate corresponding parts.

My invention has for its object to improve the construction of my improved elevator, patented November 15, 1870, and numbered 109,275, so as to make it more effective in operation, and more convenient in use; and it consists in the construction and combination of various parts of the elevator, as hereinafter more fully described.

A is the shaft, to which the hoist-wheel B is attached. The outer journal of the shaft A works in bearings in the frame-work C of the hoist-way, and its inner journal works in bearings in the bracket D, attached to the frame-work of the hoist-way or building. Upon the inner end of the shaft A is placed a pinion-wheel, E, which is so arranged as to slide upon said shaft while being carried around with the shaft in its revolution. The teeth of the pinion-wheel E mesh into the teeth of the internally-toothed gear-wheel F, formed upon or attached to the end of the drum G attached to the shaft H, the ends of which revolve in bearings in the brackets D and I. J is the countershaft, the ends of which revolve in bearings in the brackets D I, and to which is attached a large gear-wheel, K, the rim of which overlaps the rim of the internally-toothed gear-wheel F of the drum G, and is so arranged that when the pinion-wheel E is thrown out of gear with either of the gear-wheels F K it will be thrown into gear with the other of said gear-wheels. To the other end of the drum G is attached, or upon it is formed, a gear-wheel, L, into the teeth of which mesh the teeth of the pinion-wheel M placed upon the countershaft J, and so arranged as to be carried around with said shaft in its revolution while being allowed to slide upon said shaft to throw it into and out of gear with the gear-wheel L. The pinion-wheels E M are moved upon their shafts to throw them into and out of gear with the gear-wheels F K L, by the levers N O, which are pivoted to the brackets D I, and the forked lower ends of which ride in grooves in the ends of the hubs of the said wheels E M. The upper ends of the levers N O are pivoted to the bar P that slides in bearings attached to the frame of the hoist-way or building. To the bar P are attached the ends of two ropes, Q R, which pass around guide-pulleys, and extend down the hoist-way, as shown in Figs. 1 and 2.

By this construction, by drawing upon one of the ropes Q R the pinion-wheel E will be thrown out of gear with the gear-wheel F, and the pinion-wheels E M will be thrown into gear with the wheels K L; and by drawing the other rope the pinion-wheels E M will be thrown out of gear with the wheels K L, and the pinion E into gear with the gear-wheel F, according as speed or power may be required. This arrangement of the gearing enables the hoisting-rope to be pulled in the same direction, whether speed or power may be required, and prevents any confusion or accident from the necessity of changing from one side of the hoist-wheel to the other each time the gearing is shifted.

To the drum G is attached the end of the rope S, which passes around guide-pulleys T attached to the frame-work of the building or hoist-way, in any convenient position. To the other end of the rope S is attached the counter-balance U, which moves up and down through a well in the hoist-way. By this construction, by making the weight U from fifty to seventy-five pounds heavier than the platform, the platform will run up of itself, and come down with the weight of one man. The weight U also enables the fly-wheel to be used in hoisting for keeping the parts in motion between the times of letting go the hand or hoisting-rope and again taking hold of it.

The other parts of the elevator are the same as described in patent 109,275.

Having thus described my invention, I claim as new and desire to secure by Letters Patent—

1. The arrangement of the internally-toothed gear-wheel F, pinion-wheels E M, and gear-wheels K L with the drum G and shaft A H J, substantially as herein shown and described, and for the purposes set forth.

2. The arrangement of the sliding bar P and levers N O with the pinion-wheels E M of the gearing E F K M L, substantially as herein shown and described, and for the purposes set forth.

3. The combination of the balance-weight U and balance-rope S with its guide-pulleys T with the drum G, substantially as herein shown and described, and for the purpose set forth.

GUSTAVUS C. TIMPE.

Witnessses:
M. GOSSELIN,
JOHN ROBERTSON.